UNITED STATES PATENT OFFICE.

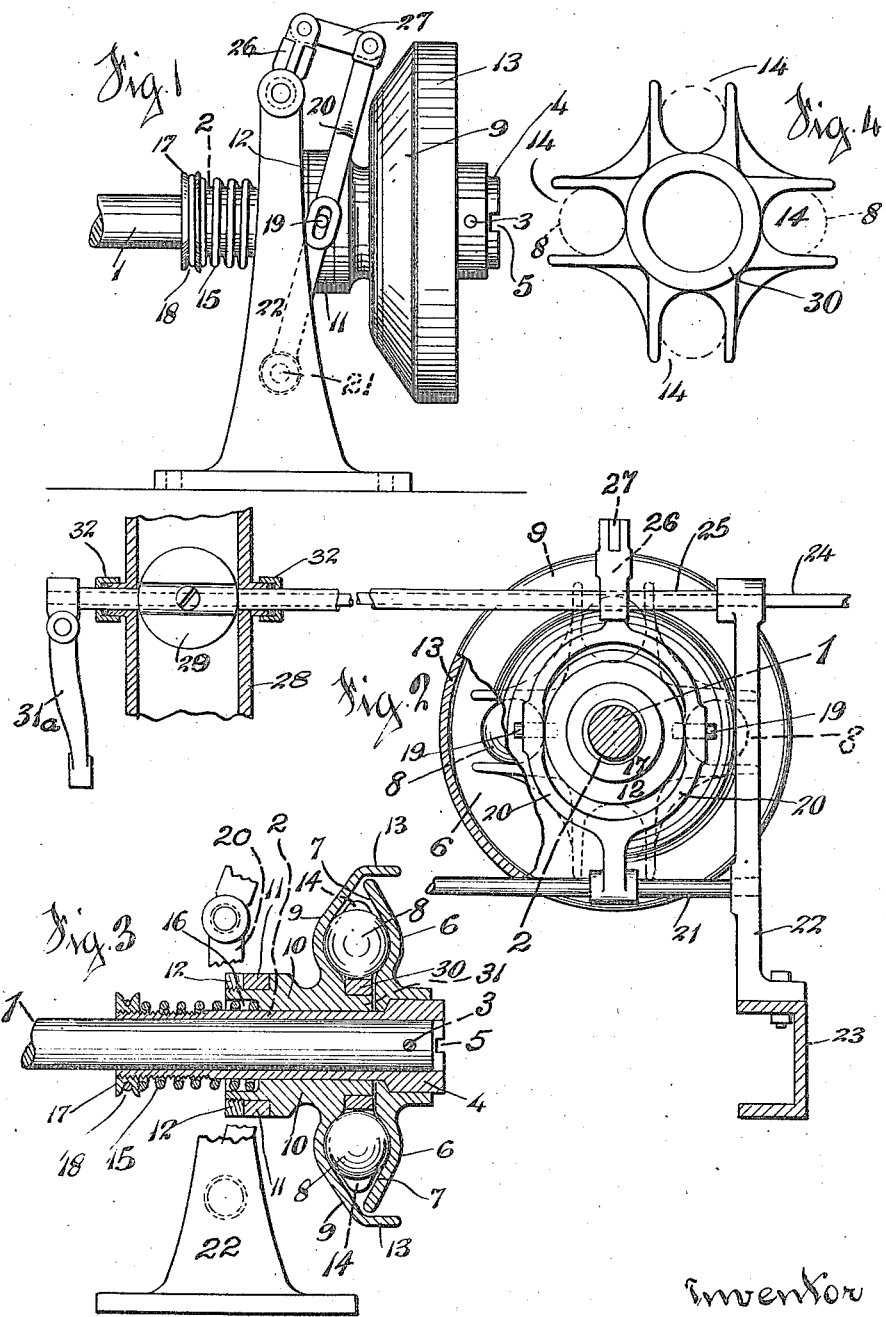

GUSTAVE A. SCHACHT, OF CINCINNATI, OHIO.

CENTRIFUGAL GOVERNOR.

1,135,054.

Specification of Letters Patent.  Patented Apr. 13, 1915.

Application filed September 2, 1913. Serial No. 787,599.

*To all whom it may concern:*

Be it known that I, GUSTAVE A. SCHACHT, a citizen of the United States of America, a resident of Cincinnati, in the county and State of Ohio, have invented a certain new and useful Improvement in Centrifugal Governors, of which the following is a specification.

This invention relates to centrifugal-governors and, more particularly, to those adapted to be used in connection with the operation of explosive or combustible engines of automobiles.

The object of the invention is to provide a governor that is at once of simple construction, highly efficient, durable, and economical to manufacture and repair, and, also, very simple in operation and installation.

The invention consists in those parts, combination of parts and details of structure as will be hereinafter fully described and then particularly pointed out in the claim that follows.

In the accompanying sheet of drawings, Figure 1 is a side elevation of a centrifugal-governor embodying my invention; Fig. 2, an end view of the device, illustrating the valve in the intake-pipe of an explosive-engine controlled thereby; Fig. 3, a longitudinal section taken through the axial center of the device seen in Fig. 1; and Fig. 4, a detail front elevation of the peculiar form of ball retaining-collar employed in my invention.

1 indicates the magneto-shaft of a gasolene explosive or combustible engine, such as those used to propel an automobile. While the governor is herein shown as being mounted on the magneto-shaft it will be readily understood that it may be mounted on any shaft that is driven by the engine. A sleeve 2 is mounted on the said shaft 1 and is secured to same by means of a pin 3 so as to rotate therewith. The sleeve 2 is provided at one end with a head 4 and has slots or recesses 5 to form a part of a magneto-connection. Mounted on the sleeve 2, adjacent the head 4 thereof, I provide a disk 6 that has an inclined, concave inner surface 7 adapted to be engaged by balls or spheres 8. The pin 3 also secures this disk 6 to the shaft for rotation therewith. Another disk 9 is mounted on the sleeve 2 and is provided with a hub 10, upon which latter a slip-collar 11 is mounted and then held in position by means of a nut 12.

The inner surface of the disk 9 is concave and inclined or flared to accommodate the said balls 8. I prefer to provide a flange 13 on the disk 9 at its outer edge so as to close or cover the gap or space between the two disks 6 and 9. Between the said disks 6 and 9 I provide a ball retaining-collar 30 (Figs. 3 and 4) that has a series of ball receptacles or pockets 14 made therein. The pockets 14 are open ones at their outer ends to allow the balls to run or course outwardly or radially between the disks 6 and 9 for duly spreading the two disks apart. The ball retaining-collar is mounted on the hub 31 of the disk 9. The disk 9 reciprocates longitudinally on the sleeve 2 and is held under spring-pressure against the disk 6 by means of the spiral 15 that surrounds said sleeve 2 and enters the circular recess or annulus 16 in the hub 10 of the disk 9. The sleeve 2 is screw-threaded to receive a threaded ring 17 that, in turn, receives the end coil of the spring 15 in an annular groove 18. The tension is thereby adjusted by means of the screw-threaded ring 17. Thus, as the speed of the shaft 1 increases, the rotation of the disks 6 and 9 increases, causing the balls 8 to be gradually thrown radially or outwardly due to the centrifugal force, thereby separating the disks 6 and 9 by moving the disk 9 backwardly against the pressure of the spring 15.

The slip-collar 11 is provided with a pair of ears or extensions 19 that engage a yoke 20 pivoted on the rod 21. The rod 21 is mounted in a standard 22 that, in turn, is mounted on the main-frame 23 of the automobile. The said standard 22 also forms a support or bearing for the valve-rod 24 that operates the throttle for the supply of the gas entering the engine. A hollow shaft or sleeve 25 is mounted to surround or telescope the operating-rod 24 and has a crank-arm 26 rigidly attached thereto. Said crank-arm 26 is connected to the upper end of the yoke 20 by means of the link 27 (Figs. 1 and 2). The said hollow shaft or sleeve 25 extends to the intake-pipe 28 leading from the carbureter of the engine and has mounted thereon a butterfly-valve 29 located within said intake-pipe 28. Thus, when the disk 9 of the governor proper is reciprocated longitudinally along the shaft 1 by means of the excessive speed of the engine, the yoke 20 is rocked on the valve-rod 21, thereby effecting a movement in the crank-arm 26 through link 27 that, in turn, rocks the hollow shaft 25 and the latter, in turn, operates the said butterfly-valve in the intake-pipe and shuts off the supply of combustible mixture into the cylinder regardless of the wide-open position of the throttle as controlled from the steering-wheel. Thus, also, the machine is automatically controlled and prevented from being raced and is thereby proof against excessive speed. Especially is this of value and effect when used in connection with an automobile truck on account of the disadvantages in racing same. The valve-rod 24 has a crank-arm 31ª adjacent the intake-pipe and connects with the main carbureter throttle. The secondary valve or automatic butterfly valve 29 is mounted within the said intake-pipe 28, as best shown in Fig. 2, there being a packing-box 32 at each side of the said intake-pipe at the point where the operating shafts enter. The governor may be regulated by means of the threaded ring or nut 17 to operate at most any desired speed, the adjustment thereof being a very simple matter to perform.

If desired, a cover, such as a collar or the like may be used or placed over the regulating nut or spring and thereby guard against the adjustment being made accidentally or the device being tampered with by unauthorized persons.

Certain modifications of my invention might be made without departing from its spirit or scope, and I do not, therefore, wish to be understood as confining myself to the exact details shown.

I claim:—

In combination, a shaft, an explosive-engine, a sleeve attached to said shaft to rotate therewith, a disk secured to said sleeve, another disk slidably-mounted on said sleeve, each of said disks being inclined or flared toward each other and each having a concave surface that faces the other, a ball retaining-collar between said disks and carrying a plurality of balls or spheres, a hub on said slidable disk, a slip-ring on said hub, an intake-pipe for said explosive-engine, a valve in said intake-pipe, and a suitable connection between said slip-ring and said valve whereby the latter is operated when said slidable disk and slip-ring are reciprocated on said sleeve.

GUSTAVE A. SCHACHT.

Witnesses:
JOHN ELIAS JONES,
WILLIAM SCHUCHARDT.